July 12, 1966  R. M. JOHNSON  3,260,826
THREE AXIS AND TRANSLATIONAL MOVEMENT CONTROLLER
Filed Oct. 26, 1964  3 Sheets-Sheet 2

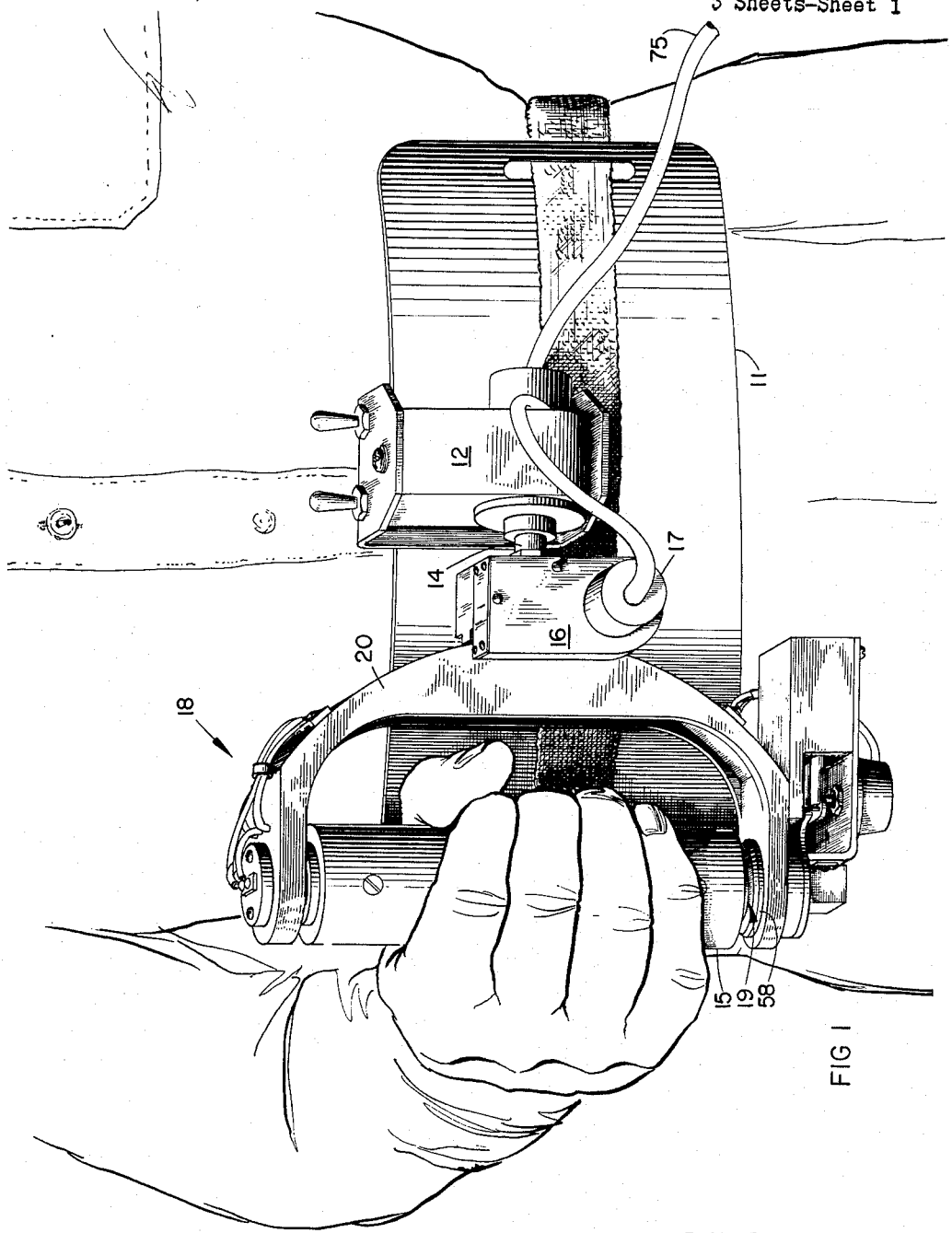

RICHARD M. JOHNSON
INVENTOR

BY Glenn H. Antrim
AGENT

July 12, 1966  R. M. JOHNSON  3,260,826
THREE AXIS AND TRANSLATIONAL MOVEMENT CONTROLLER
Filed Oct. 26, 1964  3 Sheets-Sheet 3

RICHARD M. JOHNSON
INVENTOR

BY *Glenn H. Antrim*

AGENT

United States Patent Office 3,260,826
Patented July 12, 1966

3,260,826
THREE-AXIS AND TRANSLATIONAL MOVEMENT CONTROLLER
Richard M. Johnson, Dallas, Tex., assignor to Ling-Temco-Vought, Inc., Dallas, Tex., a corporation of Delaware
Filed Oct. 26, 1964, Ser. No. 406,369
6 Claims. (Cl. 200—157)

This invention pertains to hand controllers for controlling self-propelled space suits, space vehicles, or remote aircraft, and particularly to hand controllers that provide some selection of both rotation and translation of vehicles in three orthogonal planes in directions corresponding to the directions of movement of the operator's hand and arm.

Space vehicles are provided with propulsion jets to orient the vehicles by change in roll, yaw, and pitch that correspond to the movements for guidance of a conventional aircraft. In addition, certain jets are balanced with respect to the center of mass of the vehicle so that it can be translated along a selected one of three orthogonal planes without rotation of the vehicle. Through timely control of the proper jets, a space vehicle can be oriented and positioned as desired. The controller of the present invention may be strapped to a man in space so that he can maneuver himself. It may provide input control signals to a transmitting system for remotely controlling vehicles that have roll, pitch, yaw and translational control means.

Former controllers have generally provided fewer than the six movements that may now be desired, or have provided multiple input control devices to be manipulated rather than a convenient single hand grip control. The controller that is shown in the accompanying drawing has five movements of operation and may be modified readily to provide an additional movement. Three movements are provided by rotative movements of the hand and three additional movements are provided in the modified hand controller by translational movement of the hand. With a requirement for a greater number of movements than the number formerly required, among the characteristics of a hand controller that need to be attained are: positive action for each movement, distinctive, different movements for each desired change of guidance to prevent accidental wrong operation, and intuitive hand motions having directions corresponding to a desired change in direction of a remote vehicle.

The controller of the present invention provides for hand movements that have directions that correspond to the desired change in directions of movement of the controlled vehicle. Detent mechanisms and springs provide a feeling of the amount of change and guard against accidental operation in an undesired direction. The layout of the hand controller results in a mechanical balance even though special balancing weights are not incorporated to provide ease of operation and to insure that the feel to the operator's hand is normal when the controller and operator are being accelerated.

An object of this invention is to couple to a single hand grip of a controller required control devices for controlling attitude and translational movement of a vehicle;

Another object is to provide movements of the hand grip of the controller that are intuitively similar to the desired change in movements of a controlled vehicle; and Still another object is to incorporate detents for each direction of movement for providing an increasing opposing force as the hand grip is positioned farther from center.

A feature of the controller is its adaptability to be mounted either on the waist of an operator or on a convenient structure where the controller is to be operated.

Other objects and features will be apparent from the specification and claims and from the accompanying drawing illustrative of the invention in which:

FIG. 1 is a front view of the hand controller of this invention while worn by an operator;

Figure 5:
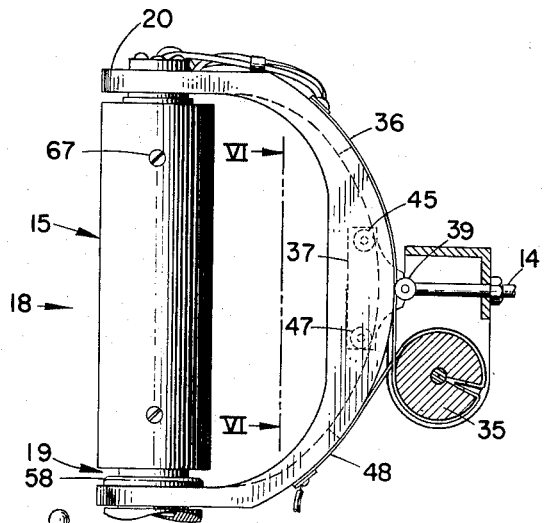
Figure 4:
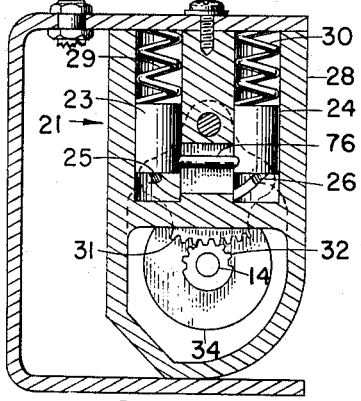
Figure 7:
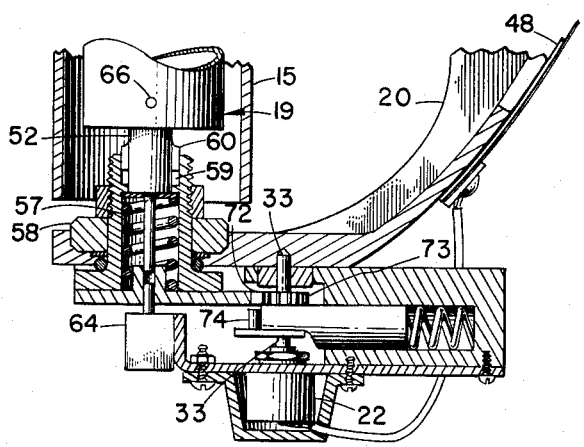
Figure 8:
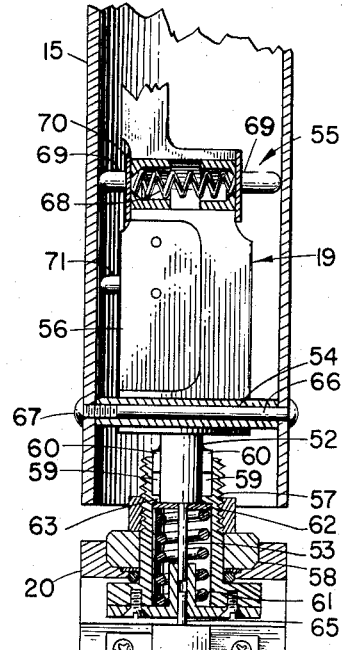
Figure 6:
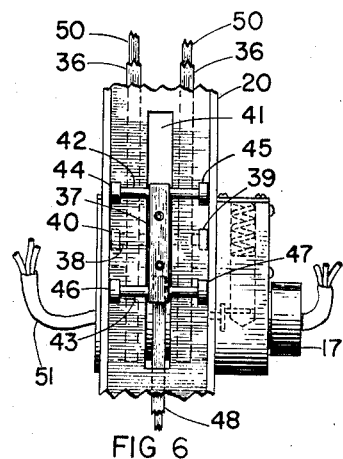
Figure 2:
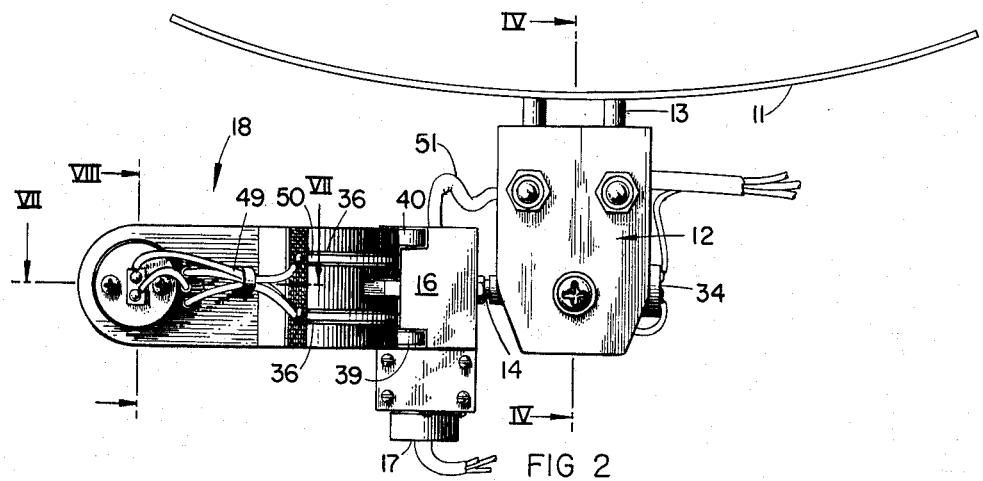
FIG. 2 is a top view of the hand controller.
Figure 3A:
Figure 3B:
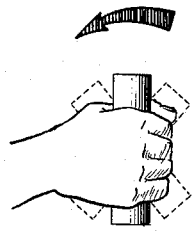
Figure 3C:
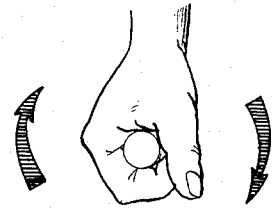
Figure 3D:
Figure 3E:
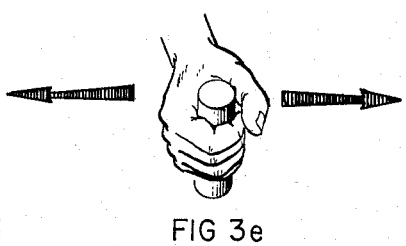

FIGS. 3a—3e are diaphragms of an operator's hand grasping a hand grip to illustrate the different directions of operation of the hand grip of the hand controller;

FIG. 4 is a cross sectional view taken on IV—IV of FIG. 2 to show a potentiometer and detent that is operated during movement illustrated in FIG. 3a;

FIG. 5 is a front view of the hand grip support to show particularly its arcuate mounting that permits movement illustrated in FIG. 3b;

FIG. 6 is a lateral cross sectional view on line VI—VI of FIG. 5;

FIG. 7 is a cross sectional view on line VII—VII of FIG. 2 to show an axial mounting of a hand-grip shank that permits rotary movement of the hand grip as illustrated in FIG. 3c and axial movement as illustraed in FIG. 3d; and FIG. 8 is a cross sectional view of the hand grip on the line VIII—VIII to show a lateral movement of the hand grip as illustrated in FIG. 3e.

With reference to FIGS. 1 and 2, the hand controller has a mounting plate 11 that is curved to conform to the waist of an operator. The mounting plate may either be strapped to the waist of an operator as shown in FIG. 1 or it may be strapped to a convenient structure in a location where the hand controller is to be used. A stationary control assembly 12 is mounted through spacers and fasteners to the central front surface of the mounting plate 11. The control assembly 12 contains a potentiometer or a suitable control element that is coupled to the shaft 14. The shaft extends from that side of the housing of the controlling assembly for mounting a hand grip 15 in a position that is convenient for the operator. The control assembly 12 is operated in response to rotation of the operator's hand about an axis in line with the operator's forearm as illustrated in FIG. 3a. When the hand controller is strapped to an operators waist and the operator is facing the general direction of travel of the controlled vehicle, the movement illustrated in FIG. 3a may be used conveniently for controlling pitch of the controlled vehicle.

An intermediate control assembly 16 is mounted on the shaft 14. This assembly contains a potentiometer 17 that is coupled through belts, as described in detail below, to a hand grip assembly 18. The potentiometer 17 is controlled in response to rotation of the operator's hand about the center of the hand grip 15 in the plane of the hand grip assembly 18 to control roll of the controlled vehicle. The hand grip assembly 18 is rotatably mounted by rollers that are mounted on the intermediate control assembly 16 and contact an arcuate surface of the hand grip assembly 18 as described in detail below.

The hand grip 15 is mounted on a shank 19 such that the hand grip is slidable diametrically on the shank but is constrained against rotation. The shank 15 is mounted on a hand grip support 20 so that the hand grip and its shank are rotatable with respect to the hand grip support and axially slidable over a limited range. The yaw of the remote vehicle is controlled by rotating the hand grip 15 and its shank 19 as illustrated in FIG. 3c. Vertical translation of the craft is controlled by axial movement of the hand grip 15 and shank 19 as illustrated in FIG. 3d, and fore and aft translation is controlled by lateral movement of the hand grip 15 with respect to its shank in the directions indicated in FIG. 3e. For controlling lateral translation, lateral movement of the hand grip 15 perpendicular to the directions shown in FIG. 3e may be incorporated. Either additional slidable mounting means may be incorporated within the hand grip 15 to provide movement of the hand grip relative to its shank 19 in directions perpendicular to the directions for controlling fore and aft movements, or the shaft 14 may be axially slidable in the stationary control assembly 12 to operate an additional control element.

Centering springs are incorporated for each direction of movement to provide a central neutral position for the hand grip and to provide a feel of the amount of departure from the neutral position. The detent that is shown in FIG. 4 is incorporated in the stationary control assembly 12, in the intermediate control assembly 16, and in the rotary drive of the hand grip 15 to provide feel for the pitch and the roll movements respectively. The same detent arrangement is coupled to a potentiometer that is responsive to rotation of the hand grip 15 and shank 19 to provide feel for yaw control. Centering spring arrangements associated with the shank 19 as illustrated in FIG. 8 provide feel for the translational movements.

In detail, the detent or centering mechanism 21 that is shown in cross section in FIG. 4 is coupled to a potentiometer 34 of the assembly 12 (FIG. 2) and a similar detent is coupled to a yaw control potentiometer 22 as shown in FIG. 7. The detent includes a pair of spring-loaded cylinders 23 and 24 that bear against pins 25 and 26 respectively. The cylinders or sliders 23 and 24 are a sliding fit within parallel cavities contained in a metallic or plastic housing 28 and are coupled together by a pin 76 so that they move in unison. Compression springs 29 and 30 are contained in the outer end of the respective cavities to press the cylinders 23 and 24 against pins 25 and 26 respectively when the associated control is in a central or neutral position. The pins 25 and 26 extend outwardly from the surface of a sector gear 31 on a circumference about a pivotal axis of the gear. The pins 25 and 26 are spaced radially so that the springs 29 and 30 exert equal forces against the pins when the teeth of the sector gear 31 are centered on its mating gear 32. The gear 32 is secured on a shaft 14 of a control device such as a potentiometer 34. The control device is generally set at a null when it is centered by the force of the springs 29 and 30. As the sector gear 31 is rotated from its centered position, an increasing opposing torque is developed as the springs 29 and 30 are compressed.

The stationary mounted control assembly 12 of FIG. 2 contains the potentiometer 34 and a detent mechanism similar to that shown in FIG. 4. The potentiometer 34 is coupled to the shaft 14 that is secured to the intermediate control assembly 16. The potentiometer is operated by rotating both the handgrip control assembly 18 and the intermediate control assembly 16 over a limited angle by rotation of the operator's hand about an axis that extends through the shaft 14, the center of the hand grip, and the operator's forearm.

The intermediate control assembly 16 also contains a potentiometer and a detent mechanism similar to that illustrated in FIG. 4. A drum 35 (FIG. 5) is attached to the shaft of the potentiometer 17 to receive drive belts 36 as shown in FIGS. 2 and 5. A tongue 37 extends perpendicularly from the intermediate control assembly 16 toward the center of the hand grip 15 as shown in FIGS. 5 and 6. A shaft 38 extends laterally through the tongue 37 and is secured thereto at a point that permits it to position roller bearings 39 and 40 as required for positioning the arcuate surface of the hand grip support 20 adjacent the intermediate control assembly 16. The roller bearings 39 and 40 are mounted on the ends of the shaft 38 such that they are spaced apart to bear on the outer surface of the arcuate portion of the hand grip support 20 near its opposite edges.

The arcuate portion of the hand grip support 20 has a central vertical slot 41 through which the tongue 37 extends. The end of the tongue 37 has a vertical elongated end portion for supporting two pairs of spaced roller bearings on the inner surface of the arcuate portion of the hand grip support 20. The bearings are mounted on parallel shafts 42 and 43 that are mounted transverse the arcuate portion through the respective ends of the elongated portion of the tongue, the mounting of shafts 42 and 43 being similar to the mounting of the shaft 38. The shaft 42 positions bearings 44 and 45 against the inside surface of the arcuate portion of the hand grip support 20 near opposite edges of the surface above the shaft 38, and the shaft 43 positions bearings 46 and 47 similarly but below the shaft 38. The three pairs of roller bearings and the tongue 37 within the slot 41 restrain the hand grip support 20 against motion in any direction except rotation on the circumference of the arcuate surface. The detent mechanism that is coupled through the shaft of the potentiometer 17 and the belts 36 to the hand grip assembly, limits the motion along the circumference and provides a desired sense of feel.

The belts may be flexible plastic with flexible copper ribbonlike conductors 50 cemented longitudinally on one surface. In FIG. 5, each one of a plurality of parallel belts 36 has one end fastened to a notch in the surface of drum 35, is wound clockwise on the surface of the drum, is wound counterclockwise on the arcuate surface of the hand grip support 20, and the other end is fastened near the top of the arcuate portion of the hand grip support. Another belt 48 of a parallel group wound in an opposite direction has an end that is also fastened in the notch of the drum 35, is wound counterclockwise on the surface of the drum, is wound clockwise on the arcuate surface of the hand grip support 20, and the other end is fastened near the bottom of the arcuate portion of the handgrip support. In FIG. 2, electrical connections from the hand grip assembly 18 are completed through conductors 49 that are soldered to the ribbonlike conductors 50 at the adjacent upper end of the belt 36. Similarly, conductors are soldered to the lower end of the belt 48. The other ends of the ribbonlike conductors are connected at the center of the drum 35 to conductors 51 that are a part of the output cable of the hand controller.

As shown in FIG. 5, an end portion extends from each end of the arcuate portion of the hand grip support 20 to provide spaced parallel mounting bars for the coaxial shank 19 on which is mounted the hand grip 15. The shank 19 has at each end a reduced coaxial cylindrical mounting end portion 52 (FIG. 8), a rod 53 extending coaxially from the reduced portion to operate a switch in response to coaxial movement of the hand grip 15, a pair of spaced, transverse, parallel mounting holes 53 for mounting the hand grip 15, a pair of detent mechanisms 55, and a switch 56. The reduced mounting end portion 52 for each end of the shank 19 is a sliding fit within a respective bushing 57. The bushing 57 is rotatably mounted within a bearing 58 that is mounted within a respective end portion of the hand grip support 20. Although the mounting end portion 52 of the shank 19 is slidable longitudinally within the bushing 57, it is constrained against rotative motion relative to the bushing by a pair of tabs 60. The radial tabs 60 project from the surface of the mounting end portion 52 and are a sliding fit within respective longitudinal slots 59 that are in the inside surface of the bushing 57. The detent at each end of the shank 19 includes a compression spring 61 and a stop washer 62. The spring 61 is contained within the lower portion of the bushing 57 and the stop washer 62 is a sliding fit within the bushing between the inner end of the spring 61 and the end of the mounting portion 52. Normally, the spring at each end of the shank 19 presses the respective washer 62 against an annular stop 63 that projects inwardly from the inside surface of the bushing 57 to locate the stop washer for centering the shank 19 between the mounting bars of the hand grip support. A switch or potentiometer 64 is mounted on the hand grip support 20 with its actuator 65 in line with the actuator rod 53 to be operated in response to coaxial movement of the hand grip 15.

The switch 56 that is shown in FIG. 8 is operated in response to lateral movement of the hand grip 15 relative to its shank 19. The pair of spaced parallel mounting holes 54 that are through the shank 19 are perpendicular to the plane of the hand grip support 20. Mounting rods 66 are slidingly fit within the mounting holes 54, and the ends of the rods are fastened to the wall of the tubular hand grip 15 by fasteners 67.

The hand grip 15 is centered in the direction of the mounting rods 66 by a pair of spaced detents 55. Holes in the shank 19 for receiving a compression spring 68 and spacers 69 are parallel to the holes 54 for receiving the mounting rods 66. One of the spacers 69 is positioned in each end of a mounting hole. The spacers have cup-shaped portions with the openings facing each other to receive respective ends of the spring 68. Reduced cylindrical portions extend outwardly through center holes of retainers 70 that are fastened to the shank 19 and are centered over the openings of the mounting holes. When the shoulder of the inner portion of each spacer 69 is pressed against the adjacent retainer 70, the outer ends of the spacers 69 contact the inside surface of the wall of the hand grip 15 to center it on the shank 19. The switch 56 has an actuator 71 that is operated by motion of the hand grip 15 as it is moved inwardly in one direction on the mounting rods 66. As the hand grip is moved, the springs 68 are compressed to provide feel of the distance that the hand grip is displaced from its normal position.

With reference to FIG. 7, the potentiometer 22 is operated in response to rotation of the hand grip 15. The rotary motion is transferred through the horizontal mounting rods 66, the shank 19, the tabs 60 to the rotatable bushing 57. The outer portion of the bushing 57 has the sector gear 72 that mates with the gear 73. The gear 73 is secured to the potentiometer shaft 33 that also carries a plate that has pins 74 corresponding to pins 25 and 26 of the detent of FIG. 4.

In operation, the hand controller is easily operated so that a controlled vehicle changes course in a direction corresponding to the direction of movement of the operator's hand. Each movement operates a switch, a potentiometer, or other electrical control device at the hand controller. Each device is connected through the cable 75 of FIG. 1 to a receiver for local control or to a transmitter modulator for remote control. Rotation of the operator's hand about the center of the forearm and about the center of the handgrip 15, as shown in FIG. 3a, operates the control device 34 in the stationary assembly 12 to control pitch. A wrist motion that rotates the handgrip in the plane of the hand grip support 20 on its arcuate mounting about the center of the hand grip 15, as shown in FIG. 3b, operates the control device 17 of the intermediate assembly 16 to control roll. Rotation of the hand grip 15 on its shank 19, as shown in FIG. 3c, operates the control device 22 to control yaw. The vertical movement of the handgrip 15 in response to vertical movement of the operator's forearm operates the control device 64 to control vertical translation of the remote aircraft, and lateral movement of the hand grip 15 on its shank 19, as shown in FIG. 3e operates the switch 56 to control fore and aft translation of the aircraft.

While only one embodiment of the invention, together with modifications thereof, has been described in detail herein and shown in the accompanying drawing, it will be evident that various further modifications are possible in the arrangement and construction of its components without departing from the scope of the invention.

I claim:

1. In a hand controller, a substantially tubular hand grip, a supporting shank for said hand grip, said hand grip encompassing said shank and being slidingly mounted thereto to permit lateral movement of said handgrip in a fixed diametrical direction, spring and stop means for positioning said hand grip diametrically in a normal position relative to sand shank, a first control device having a spring return actuator positioned to cause operation of said device in response to lateral movement of said hand grip from its normal position, a handgrip support, a spring and stop means for positioning said shank axially in a normal position relative to said handgrip support, and a second control device having an actuator positioned to be operable in response to axial movement of said shank as a result of application of axial force to said hand grip.

2. In a hand controller, a substantially tubular hand grip, a supporting shank for said hand grip, a plurality of spaced parallel supporting rods fixed diametrically across said grip, said shank having correspondingly spaced diametric holes therethrough for receiving corresponding ones of said supporting rods for slidingly mounting said grip on said shank so that said grip is movable in the direction of the axes of said supporting rods transverse the axial direction of said grip and said shank, said shank having a plurality of spaced centering assemblies, each of said spaced centering assemblies comprising a pair of diametrically opposed spacers slidingly mounted within holes transverse said shank, a retainer for each of said spacers, a compression spring mounted between said spacers of each of said pairs to urge them outwardly against their respective retainers so that the opposite ends of said spacers bear against the inside surface of said hand grip, thereby to center said grip along said supporting rods relative to said shank, a hand grip support having openings for slidingly receiving the ends of said shank, an axial compression spring mounted within each of said opening of said hand grip to urge said shank into a normal centered position, stop means for each of last mentioned springs to prevent each of said springs expanding to a length greater than that necessary for centering said shank, a first control device having a spring return actuator positioned for operation in response to lateral movement of said grip along said supporting rods, and a second control device having an actuator aligned with an end of said shank, said actuator being operated in response to application of axial force greater than that normally exerted by one of said axial compression springs.

3. In a hand controller having first and second control assemblies, first and second signal controlling devices, said first control assembly having a hand grip and a hand grip support member, said first signal controlling device being operable in response to axial movement of said hand grip relative to said hand grip support member, said hand grip support member having an arcuate segment in a plane that contains the axis of said hand grip, the center of said arcuate segment being substantially the center of said hand grip, said arcuate segment being sufficiently wide to accommodate on its inner and outer arcuate surfaces bearing surfaces spaced apart to resist readily rotation of said hand grip support other than in the plane of said arcuate segment, said second signal controlling device being operable in response to rotation of said hand grip support in the direction of the circumference of said arcuate segment, said second control assembly having a bearing support member extending therefrom, said bearing support having a plurality of bearing surfaces for said inner and for said outer arcuate surfaces of said arcuate segment, said bearing surfaces being spaced apart on different circumferences of said arcuate surfaces and on different radii of said arcuate surfaces to restrain motion of said first control assembly except rotative movement in the direction of the circumference of said arcuate segment so that said second signal controlling device is operated by rotative movement about the center of said hand grip but is not operated by axial movement of said hand grip.

4. In a hand controller as claimed in claim 3, said arcuate segment having a central circumferential slot, said bearing support having a pair of laterally spaced bearings to provide said bearing surfaces on the outer surface of said arcuate section and a tongue that extends through said slot, an assembly of four bearings to provide said bearing surfaces on the inner surface of said arcuate segment, said assembly of four bearings being secured to said tongue such that said last mentioned bearings are spaced laterally in pairs on the inside surface of said arcuate segment, said last mentioned pairs being spaced circumferentially in opposite directions from said pair of bearings for said outer surface.

5. A hand controller having a hand grip member with an arcuate segment, a control assembly having a rotatable control device, means for mounting said arcuate segment to said control assembly so that said hand grip member is rotatable over a limited arc in the plane of said arcuate segment, said hand grip member having a plurality of control devices that are to be connected through said control assembly, a pair of belts of flexible insulating material, a flexible conductive strip adhering lengthwise to each of said belts, a drum on said rotatable control device, each of said belts being attached to the outer surface of the respective ends of said arcuate segment and said belts being wound in opposite directions on said drum to provide non-backlash transfer of rotary motion from said hand grip member to said rotatable control device, and current circuits of said control devices being completed through said flexible conductive strips.

6. A hand controller for controlling orientation and translation of a vehicle in directions corresponding to directions of motion of an operator's hand comprising:

a fixed control assembly, a hand grip support assembly, and a hand grip assembly, said fixed control assembly having a first control device with a rotatable shaft coupled to said hand grip support assembly, said first control device being operable in response to rotation of said hand grip support about an axis corresponding to that of the operator's arm for controlling the position of said hand grip, said hand grip support assembly having rotatable arcuate mounting means to provide limited rotation of said hand grip about the center of said hand grip in a plane that includes the axis of said hand grip and the arm of the operator, a second control device operable in response to rotation of said hand grip about its center in said plane, said hand grip assembly including a hand grip and a shank, means for mounting said shank in said hand grip support assembly to provide limited axial movement only of said shank in said hand grip support assembly, means for mounting said hand grip on said shank to permit limited rotation of said hand grip about its axis and also limited lateral movement in a direction perpendicular to the axis of said hand grip, a third control device coupled to said shank, said third control device being operable in response to axial movement of said hand grip and said shank, fourth and fifth control devices coupled to said hand grip, said fourth control device being operable in response to rotation of said hand grip about its axis, said fifth control device being operable in response to said limited lateral movement, and detent means for applying force to maintain each of said assemblies in a normal position relative to each other unless a greater opposing force is applied to the hand grip by an operator in required directions for operating a respective one of said control devices.

References Cited by the Examiner
UNITED STATES PATENTS

| | | | |
|---|---|---|---|
| 2,470,968 | 5/1949 | Aske. | |
| 2,543,450 | 2/1951 | Feagin | 244—83 |
| 3,028,126 | 4/1962 | Holleman | 244—83 |

MILTON BUCHLER, *Primary Examiner.*

ANDREW H. FARRELL, FERGUS S. MIDDLETON,
*Examiners.*